(12) United States Patent
Kress (10) Patent No.: US 9,600,662 B2
(45) Date of Patent: Mar. 21, 2017

(54) USER CONFIGURABLE PROFILES FOR SECURITY PERMISSIONS

(71) Applicant: T-Mobile USA, Inc., Bellevue, WA (US)

(72) Inventor: Darren J. Kress, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 134 days.

(21) Appl. No.: 14/297,867

(22) Filed: Jun. 6, 2014

(65) Prior Publication Data

US 2015/0356283 A1    Dec. 10, 2015

(51) Int. Cl.
*G06F 7/04* (2006.01)
*G06F 21/53* (2013.01)

(52) U.S. Cl.
CPC ...... *G06F 21/53* (2013.01); *G06F 2221/2141* (2013.01)

(58) Field of Classification Search
CPC .......... G06F 21/44; G06F 21/51; G06F 21/10; G06F 8/61; G06F 21/52
See application file for complete search history.

(56) References Cited

U.S. PATENT DOCUMENTS

| | | | | |
|---|---|---|---|---|
| 8,255,280 B1* | 8/2012 | Kay | ........................ | G06F 21/53 705/26.1 |
| 8,281,410 B1* | 10/2012 | Sobel | ........................ | G06F 21/00 726/1 |
| 8,473,739 B2* | 6/2013 | Clinick | ........................ | G06F 21/51 709/227 |
| 8,930,944 B2* | 1/2015 | Goodwin | ........................ | G06F 8/20 717/120 |
| 9,112,866 B2* | 8/2015 | Carrara | | |
| 2005/0091658 A1* | 4/2005 | Kavalam | ........................ | G06F 21/31 718/104 |
| 2005/0172126 A1* | 8/2005 | Lange | ........................ | G06F 21/53 713/166 |
| 2007/0189718 A1* | 8/2007 | Kobayashi | ........................ | G11B 20/00086 386/230 |
| 2007/0220021 A1* | 9/2007 | Kato | ........................ | G06F 17/30017 |
| 2008/0134297 A1* | 6/2008 | Clinick | ........................ | G06F 21/51 726/4 |
| 2008/0244723 A1* | 10/2008 | Brewster | ........................ | H04L 63/0227 726/11 |
| 2009/0313621 A1* | 12/2009 | Dewa | ........................ | G11B 20/00086 718/1 |

(Continued)

*Primary Examiner* — Techane Gergiso
(74) *Attorney, Agent, or Firm* — Lee & Hayes, PLLC (57) ABSTRACT

Permissions specified within an application permission manifest file of an application may be superseded with customized permissions. A user may customize the permissions by denying permissions, granting permissions, or requesting a prompt prior to an application attempting to access functionality and/or data protected by a permission. A user may customize permissions on a global or per application basis. Upon receiving input to customize a permissions profile, a package manager module creates a new permissions manifest file associated with an application. Upon receiving input to execute an application, a runtime environment that may be provided by the runtime accesses the new permissions manifest file instead of an original permissions manifest file, and operates the application using permissions granted in the new permissions manifest file.

20 Claims, 8 Drawing Sheets

(56) References Cited

U.S. PATENT DOCUMENTS

| | | | |
|---|---|---|---|
| 2011/0197287 A1* | 8/2011 | Hess | G06F 21/10 726/30 |
| 2012/0317638 A1* | 12/2012 | Carrara | G06F 21/44 726/17 |
| 2013/0054960 A1* | 2/2013 | Grab | G06F 21/10 713/155 |
| 2013/0111271 A1* | 5/2013 | Baltes | G06F 11/26 714/38.1 |
| 2013/0125210 A1* | 5/2013 | Felt | H04L 63/10 726/4 |
| 2013/0333039 A1* | 12/2013 | Kelly | G06F 21/51 726/24 |
| 2014/0173761 A1* | 6/2014 | Hong | G06F 21/10 726/30 |
| 2014/0208314 A1* | 7/2014 | Jeswani | G06F 9/45533 718/1 |
| 2014/0283110 A1* | 9/2014 | Quong | G06F 21/60 726/27 |

\* cited by examiner

USER CONFIGURABLE PROFILES FOR SECURITY PERMISSIONS

BACKGROUND

Applications are created by programmers to fulfill specific tasks on a user device. For example, applications may provide utility, entertainment, and/or productivity functionalities to a user of the user device. Applications may be built into a user device (e.g., telecommunication, text message, clock, camera, etc.) or may be customized (e.g., games, news, transportation schedules, online shopping, etc.). An application is installed on a user device prior to fulfilling a specific task associated with the application. When users seek to install an application on to a user device, the users are prompted to grant certain permissions for an installation to occur. A permission is a restriction limiting or granting access to a functionality and/or to data on a user device. For example, a user may be prompted to allow the application to modify or delete stored content, receive text messages (SMS), manage other applications, record audio, pinpoint geographical location, access network services, determine user device status, or identity, modify, and read contact information, etc.

Often times, applications on user devices are configured by default to request that users grant the applications permission to access the functionalities and/or data stored on the user devices, even though an application may not use such access to execute the primary functions of the applications. Accordingly, by allowing applications to access a variety of excessive and unnecessary user device functionalities and/or data, users potentially expose themselves to privacy risks. For example, excessive permissions may be used by rogue applications to maliciously and unintentionally perform actions that steal sensitive user information or increase the likelihood of loss of confidentiality, integrity, or availability of sensitive information or critical services without a user's awareness.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, techniques for allowing a user to define permissions profiles for applications, regardless of the permissions specified within an application's permissions manifest file. A permissions manifest file may be a file that lists default permission settings for an application. A user may customize permissions by denying permissions, granting permissions, or requesting to be prompted with permission options prior to an application using the permissions to attempt to access functionalities provided by a user device and/or data stored on a user device. A user may customize permissions on a global or per application basis. The techniques described herein may reduce the likelihood that a user may be impacted by mobile malware, fraudulent SMS, and unauthorized sensitive data disclosure by limiting an application's access to excessive security permissions.

Operating systems (e.g., Android, etc.) allow developers to configure a large number of permissions for use in applications. A permission is a restriction limiting or granting access to a functionality provided by a user device or to data on a user device. Such restrictions may be used to protect critical data and functionalities that could be misused to negatively affect a user's experience. Examples of permissions include allowing an application to capture audio and/or video output, allowing an application to disable the user device, allowing an application to broadcast SMS receipt notifications, allowing an application to add voicemails into the system, allowing an application to access precise location from location sources such as GPS, cell towers, and Wi-Fi, etc.

If an application desires to access a feature protected by a permission, the application may declare that it seeks that permission by inserting an element in a permissions manifest file associated with the application. A list of permissions may be identified in the permissions manifest file described above. For example, in the Android® Operating System, a list of permissions may be identified in an AndroidManifest.xml file. In other operating systems, however, other types of permissions manifest files may identify the list of permissions. In at least some embodiments, the permissions manifest file may be located at the root of an application directory of an operating system.

In some instances, when an application is being installed on a user device, an installer application may determine whether to grant requested permissions by checking authorities that signed the application's certificates and, in some embodiments, asking a user to grant the requested permissions. In an instance where user input is requested, a user may be presented with a user interface notifying the user that he or she may install the application by granting permissions in a list of permission requests. In such instances, a user may be presented with the list of permissions and may have two options: grant the requested permissions and proceed with installation of the application, or cancel the installation. Many users may be unfamiliar with the permissions requested, unaware of the impacts of granting a permission, or are willing to accept risks associated with granting a permission to gain the claimed functionality of the application. Accordingly, many users grant an application permissions requested by the application and proceed with the installation without a clear understanding of the ramifications.

Often times, applications on user devices are configured by default to request that users grant the applications permission to access the functionalities and/or data stored on the user devices, even though an application may not use such access to execute the primary functions of the applications. Accordingly, by allowing applications to access a variety of excessive and unnecessary user device functionalities and/or data, users potentially expose themselves to privacy risks. For example, excessive permissions may be used by rogue applications to maliciously and unintentionally perform actions that steal sensitive user information or increase the likelihood of loss of confidentiality, integrity, or availability of sensitive information or critical services without the user's awareness.

This disclosure describes, in part, techniques for allowing a user to define permissions profiles associated with applications, regardless of the permissions specified within the applications' permissions manifest files. A user may customize permissions by denying permissions, granting permissions, or requesting to be prompted with permission options prior to an application using the permissions to attempt to access functionalities provided by a user device and/or data stored on a user device. A user may customize permissions on a global or per application basis. A global permissions manifest file may define a permissions profile for all applications associated with a user device. A permissions profile defined on a per application basis may be limited to controlling the permissions granted for a particular application. The techniques described herein may reduce the likelihood that a user may be impacted by mobile malware, fraudulent SMS, and unauthorized sensitive data disclosure by limiting an application's access to excessive security permissions.

Example Environment

Figure 1:
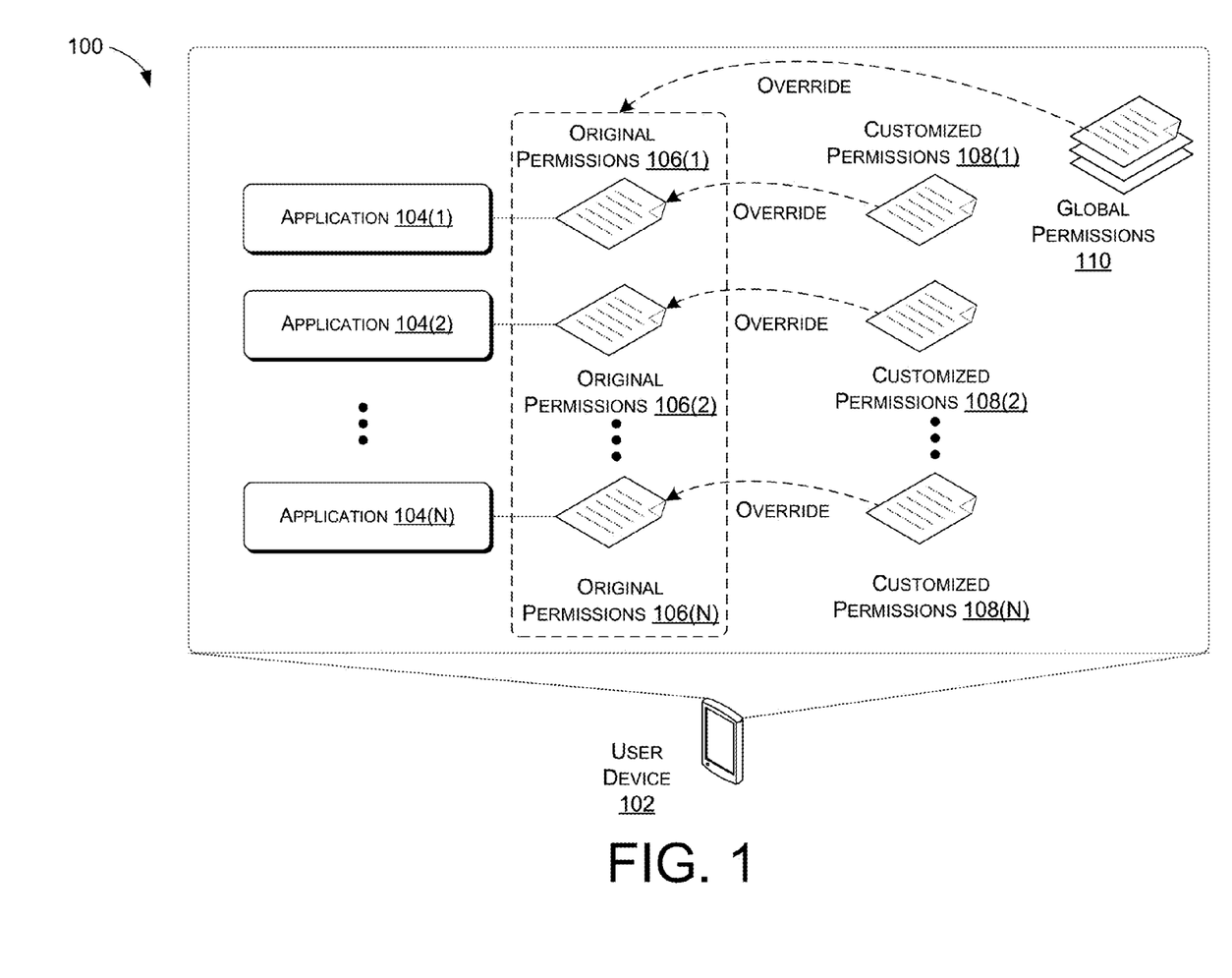
FIG. 1 is a schematic diagram showing an illustrative environment for customizing permissions profiles for applications.

FIG. 1 is a schematic diagram showing an illustrative environment 100 for customizing permissions profiles for applications. FIG. 1 includes a user device 102 storing a plurality of applications 104(1)-104(N) and original permissions manifest files 106(1)-106(N), customized permissions manifest files 108(1)-108(N), and a global permissions manifest file 110.

User device 102 can represent a diverse variety of device types and is not limited to any particular type of user device. Examples of user device 102 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, personal data assistants (PDAs), portable gaming devices, media players, cameras, or the like. Example embedded computers can include network enabled televisions, integrated components for inclusion in a computing device, appliances, microcontrollers, digital signal processors, or any other sort of processing device, or the like.

In some embodiments, one or more applications 104(1)-104(N) may be stored on the user device 102 and may establish data communication with an application server through a data connection to a base station, which is then routed to the application server through the core network via a service node. As described above, applications 104(1)-104(N) may include applications that provide utility, entertainment, and/or productivity functionalities to a user of the user device 102. For example, the one or more applications 104(1)-104(N) may include a navigation application that uses a data request to fetch map data from the application server, or a news application that uses a data request to fetch news information from the application server. Other examples of the one or more applications 104(1)-104(N) may include applications for games to be played on the user device 102, applications for shopping on the user device 102, applications for sharing documents on the user device 102, etc.

In some embodiments, individual applications 104(1)-104(N) of the one or more applications 104(1)-104(N) may desire to access a feature protected by a permission. In such embodiments, such applications 104(1)-104(N) may declare that they seek that permission by inserting an element in an original permissions manifest file 106(1)-106(N). A list of permissions may be identified in original permissions manifest files 106(1)-106(N) associated with the individual applications 104(1)-104(N). In general, a user does not have the ability to individually grant or deny permissions in an original permission manifest file (e.g., original permissions manifest file 106(1)) of an application, such as the application 104(1). Rather, the original permission manifest file (e.g., original permissions manifest file 106(1)) is configured such that the user device 102 asks the user to either grant or deny all the permissions listed in the original permissions manifest file 106(1) in their entirety during the installation of the application 104(1). The original permissions manifest files 106(1)-106(N) may be stored on the user device 102.

In various embodiments, the user may be provided with an opportunity to create customized permissions manifest files 108(1)-108(N) that are associated with the individual applications 104(1)-104(N). In at least one embodiment, upon receiving a request to install an application, such as the application 104(1), the user device 102 may prompt a user for input to grant or deny individual permissions for defining a customized permissions profile. Upon receiving the customized permissions profile, the user device 102 may create a new permissions manifest file, such as customized permissions manifest file 108(1). The user device 102 may also repeat these procedures during the installation of other applications, such as the applications 104(2)-104(N). Thus, when the user device 102 receives input to execute one of the applications 104(1)-104(N), the user device may access one of the corresponding customized permissions manifest files 108(1)-108(N), instead of a corresponding one of the original permissions manifest files 106(1)-106(N).

Upon receiving subsequent requests to execute applications 104(1)-104(N), the user device 102 may continue to access the applicable customized permissions manifest files 108(1)-108(N), instead of the original permissions manifest files 106(1)-106(N). As a result, the applications 104(1)-104(N) may execute using customized permissions profiles in the customized permissions manifest files 108(1)-108(N) instead of the permissions granted in the original permissions manifest files 106(1)-106(N). In at least some embodiments, at least one of the customized permissions manifest files 108(1)-108(N) may grant fewer permissions than a corresponding one of the original permissions manifest files 106(1)-106(N).

In at least some embodiments, the user device 102 may also include a global permissions manifest file 110. The global permissions manifest file 110 may be accessible via a settings menu provided by the user device 102. In such an embodiment, a user may be presented with a list including a plurality of permissions and the user may identify a preference (i.e., grant or deny) for each of the permissions on the list, thereby defining a global permissions profile. Upon receiving user input defining the global permissions profile, the global permissions may be stored in the global permissions manifest file 110. Then, upon receiving input to launch any of the applications 104(1)-104(N), the user device 102 may access the global permissions manifest file 110 instead of the individual original permissions manifest files 106(1)-106(N). As a result, the applications 104(1)-104(N) may execute using the global permissions profile in the global permissions manifest file 110 instead of the permissions in the original permissions manifest files 106(1)-106(N). In at least some embodiments, the global permissions manifest file 110 may grant fewer permissions than the original permissions manifest files 106(1)-106(N).

Illustrative Embodiment

Figure 2:
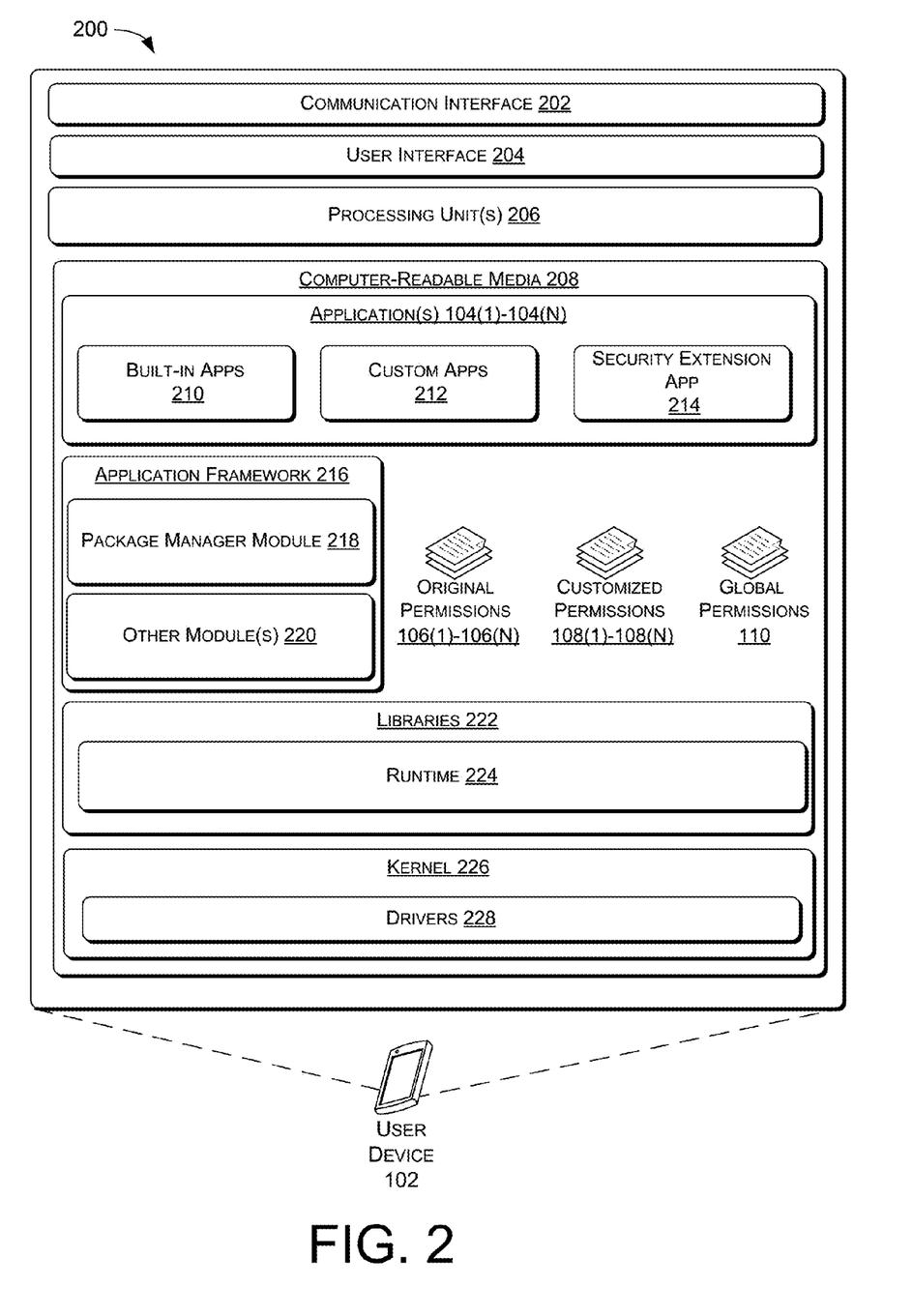
FIG. 2 is a schematic diagram that illustrates selected components of a customizable permissions framework on a user device.

FIG. 2 is a block diagram that illustrates selected components of a customizable permissions framework 200 on a user device 102. The user device 102 may include a communication interface 202, a user interface 204, one or more processing units 206, and/or computer-readable media 208.

The communication interface 202 may include wireless and/or wired communication components that enable the user device 102 to transmit or receive voice or data communication via a telecommunication network or the Internet.

The user interface 204 may enable a user to provide inputs and receive outputs from the user device 102. The user interface 204 may include a data output device (e.g., visual display, audio speakers, etc.), and one or more data input devices. The data input devices may include, but are not limited to, combinations of one or more of keypads, keyboards, mouse devices, touch screens, microphones, speech recognition packages, and any other suitable devices or other electronic/software selection methods. For simplicity, some components are omitted from the illustrated device.

The one or more processing unit(s) 206 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various embodiments, the one or more processing unit(s) 206 may execute one or more modules and/or processes to cause server(s) to perform a variety of functions. Additionally, each of the one or more processing unit(s) 206 may possess its own local memory, which also may store program modules, program data, and/or one or more operating systems.

The computer-readable media 208 may include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a user device and/or hardware component that is part of a user device or external to a user device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media may embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

The computer-readable media 208 may also include one or more applications 104(1)-104(N), permissions manifest files, (e.g., original permissions manifest files 106(1)-106(N), customized permissions manifest files 108(1)-108(N), and global permissions manifest file 110) application framework 216, libraries 222, and at least one kernel 226. As described above, the applications 104(1)-104(N) may include applications that provide utility, entertainment, and/or productivity functionalities to a user of the user device 102. For example, the applications 104(1)-104(N) may include electronic mail applications, remote desktop applications, web browser applications, navigation applications, multimedia streaming applications, and/or so forth. The one or more applications 104(1)-104(N), as described above, may include built-in applications 210, custom applications 212, and/or a security extension application 214, such as a TrustZone® application, that is compatible with the ARM® family of processors produced by ARM Holdings PLC of Cambridge, England.

Built-in applications may be installed on a user device 102 prior to acquisition of the user device 102 by a user. Examples of built-in applications include telephony applications, contacts applications, electronic mail applications, camera applications, calendar applications, clock applications, SMS/MMS applications, etc. In some embodiments, custom applications may be acquired from third party providers after a user acquires the user device 102. Examples of custom apps may include game applications (e.g., Amazed, Clickin2DaBeat, etc.), photo applications (e.g., Panoramio, Photostream, etc.), customized ringtone applications (e.g., RingsExtended, etc.), etc. The one or more applications 104(1)-104(N) may also include a security extension application 214, which is an application capable of providing system-wide security by partitioning system assets into regions (e.g., a secured environment and a normal environment), as described above. In at least some embodiments, one or more of the applications 104(1)-104(N) (e.g., a security extension application such as TrustZone®, etc.) may execute techniques described herein, similar to a package manager module 218 described below.

In at least one embodiment, the application framework 216 may include a plurality of modules for implementing a standard structure of an application, such as application 104(1). The application framework 216 may include modules such as the package manager module 218 and other modules 220 (e.g., activity manager module, resource manager module, location manager module, etc.).

In at least one embodiment, the package manager module 218 may present a user with a list of permissions as designated by the original permissions manifest files 106(1)-106(N) during installation of an application, such as application 104(1). The package manager module 218 may also receive user input granting or denying individual permissions for defining customized permissions and/or global permissions profiles. The package manager module 218 may modify original permissions manifest files, such as original permission manifest files 106(1)-106(N), and/or create new permissions manifest files, such as customized permissions manifest files 108(1)-108(N) and global permissions manifest file 110, based on the user input received.

The computer-readable media 208 may also store the original permissions manifest files 106(1)-106(N), the customized permissions manifest files 108(1)-108(N), and the global permissions manifest file 110, as described above. In at least one embodiment, each of the original permissions manifest files 106(1)-106(N) and each of the customized permissions manifest files 108(1)-108(N) may be stored in the root of a corresponding application of the applications 104(1)-104(N). In at least one other embodiment, the original permissions manifest files 106(1)-106(N), the customized permissions manifest files 108(1)-108(N), and/or the global permissions manifest file 110 may be stored in the application framework 216 and/or stored in one or more modules of the application framework 216.

The libraries 222 may include various libraries for storing data (e.g. surface manager, media framework, FreeType, etc.). Additionally, the libraries 222 may include runtime 224 (e.g., Android Runtime, etc.) for permitting application 104(1)-104(N) to interface with the environment (e.g., environment 100 or 200) in which they are running. The runtime 224 may include core libraries and may provide multiple runtime environments. In some embodiments, the multiple runtime environments may be virtual machines (e.g., Dalvik Virtual Machine, application virtual machine, etc.). In response to receiving input to execute an application, such as the application 104(1), a runtime environment created for the application 104(1) may access a customized permissions manifest file, such as customized permissions manifest file 108(1), or the global permissions manifest file 110, instead of a corresponding original permissions manifest file, such as original permissions manifest file 106(1). Accordingly, the multiple runtime environments provided by the runtime 224 may execute applications 104(1)-104(N) according to permissions defined in corresponding customized permissions manifest files 108(1)-108(N) and/or the global permissions manifest file 110, instead of the permissions defined in the corresponding original permissions manifest files 106(1)-106(N). In at least some embodiments, the runtime environments (e.g., virtual machines) created by hypervisors may provide similar functionalities.

The kernel 226 may store a plurality of drivers 228 including display drivers, camera drivers, WiFi drivers, audio drivers, flash memory drivers, keypad drivers, etc. The computer-readable media 208 may include kernels in addition to kernel 226. In at least one embodiment, the kernel 226 may receive input to execute an application. In turn, the kernel 226 may start a process in which a runtime 224 may create a runtime environment for executing the application. In at least some additional embodiments, one or more kernels (e.g., Android kernel module, SELinux policy, etc.) may execute functionality similar to a package manager module 218 described above.

Per Application Installation

Figure 3A:
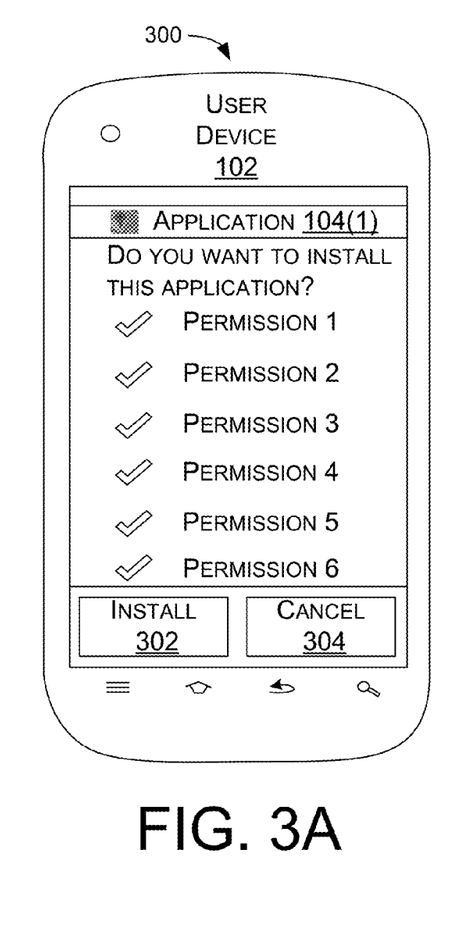
FIG. 3A illustrates an example user interface for installing an application.
Figure 3B:
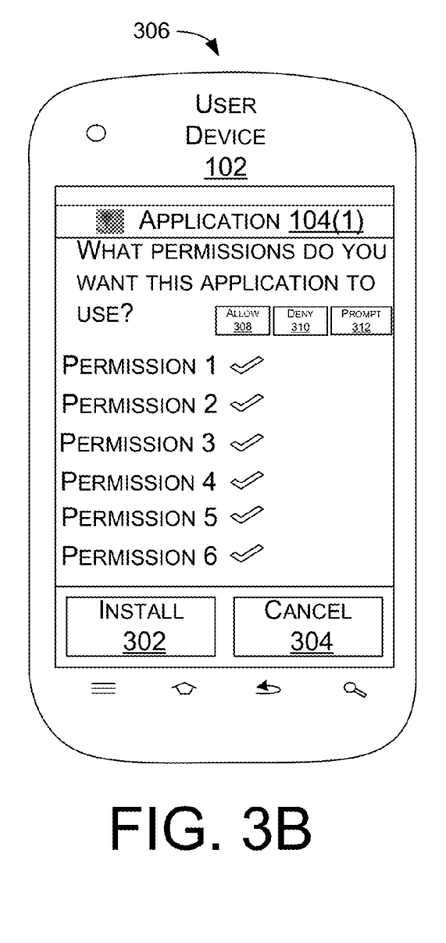
FIG. 3B illustrates an embodiment of a default user interface for customizing permissions profiles for applications.
Figure 3C:
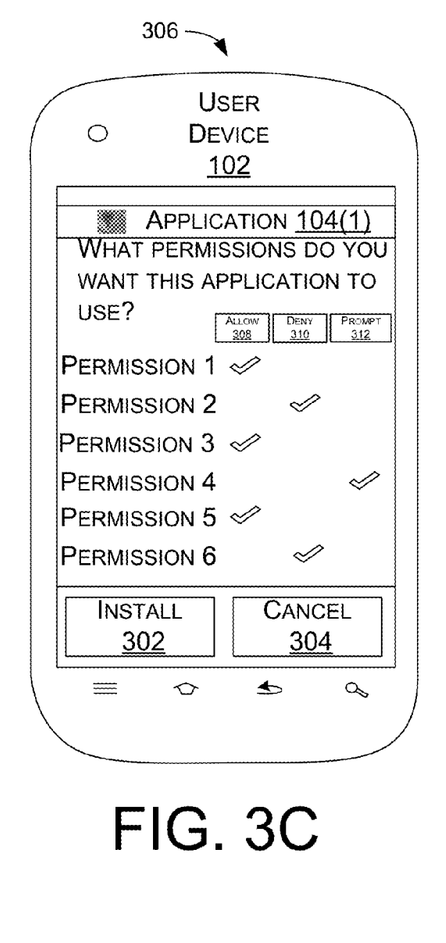
FIG. 3C illustrates an additional embodiment of a user interface for customizing permissions profiles for applications.

FIGS. 3A-3C illustrate embodiments of user interfaces 300 and 306 that may be presented to a user when installing an application, such as the application 104(1). In FIG. 3A, user interface 300 is displayed on user device 102. In at least one embodiment, when a user desires to install the application 104(1), the package manager module 218 may prompt a user by the user interface 300 requesting that the user grant a plurality of permissions (e.g., permissions 1-6). In such an embodiment, permissions 1-6 represent the list of permissions identified in the original permissions manifest file corresponding to application 104(1), such as original permissions manifest file 106(1), as described above.

In the at least one embodiment, if a user wants to install the application 104(1) and execute the functionality associated with the application 104(1), the user selects the install option 302. Upon selection of the install option 302, the application 104(1) may be installed on user device 102. As shown by the small check marks in front of each of the permissions listed in the list of permissions, the package manager module 218 may grant application 104(1) permission to access functionalities and/or data stored on the user device 102 corresponding to permissions 1-6 any time the user device 102 runs the application 104(1). If the user does not want to grant any one of permissions 1-6, the user's only option is to select the cancel option 304 and the application 104(1) will not be installed.

Many times, as described above, application 104(1) does not use every permission requested in the list of permissions to properly function. At least some of these permissions may be excessive and unnecessary permissions, potentially exposing users to privacy risks. For example, excessive permissions may be used by rouge applications to maliciously and unintentionally perform actions that steal sensitive user information or increase the likelihood of loss of confidentiality, integrity, or availability of sensitive information or critical services without a user's awareness, as described above.

FIGS. 3B and 3C illustrate embodiments of a user interface 306 presented to users for customizing permissions profiles for applications, as described herein. User interface 306 is displayed on user device 102. In at least one embodiment, when a user desires to install an application, such as the application 104(1), the package manager module 218 may prompt a user by presenting user interface 306, instead of user interface 300. As shown in the embodiment in FIG. 3B, the application 104(1) is requesting access to permissions 1-6, as indicated by the original permissions manifest file 106(1) for the application 104(1). However, as shown in FIG. 3C, the user may customize which permissions the application 104(1) may access and in doing so, may define a customized permissions profile for the application 104(1).

Figure 4:
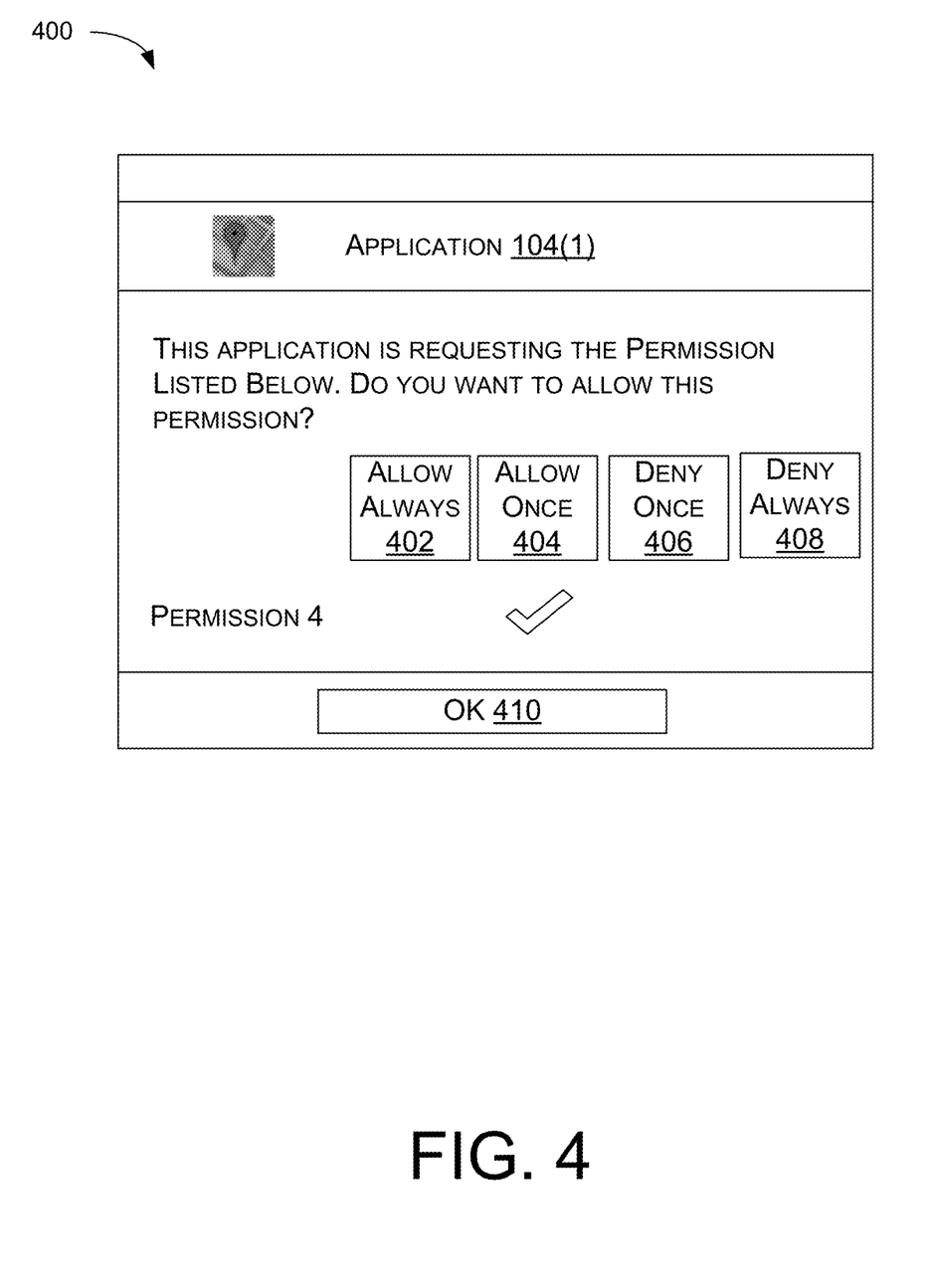
FIG. 4 illustrates a prompt on a user interface for customizing a permission for an application.

In the at least one embodiment, the package manager module 218 may prompt the user to "allow" 308 a particular permission, "deny" 310 a particular permission, or receive a "prompt" 312 prior to an application using a particular permission of a list of permissions (e.g., permissions 1-6). In at least one embodiment, when a user indicates he or she would like to "allow" 308 a particular permission, he or she may be indicating that he or she wishes to grant the permission. In an alternative embodiment, when a user indicates he or she would like "deny" 310 a particular permission, he or she may be indicating that he or she would like to disable the permission for the application 104(1). In an embodiment when a user selects "prompt" 312, the user indicates that he or she would like to receive a prompt prior to the application 104(1) accessing the functionality or data that is protected by a particular permission. An example embodiment of a prompt presented by the package manager module 218 in response to a user selecting "prompt" 312 is illustrated in FIG. 4 and discussed below.

As illustrated in FIG. 3B, the user interface 306 shows an example embodiment of a user interface that is presented by the package manager module 218 and lists permissions as indicated by the original permissions manifest file 106(1) corresponding to the application 104(1). FIG. 3B may represent a default user interface wherein all of the permissions requested by the original permissions manifest file 106(1) are allowed, as indicated by the check marks next to each of the permissions in the "allow" 308 column. If a user selects the install option 302, the package manager module 218 may grant all of the permissions requested by the original permissions manifest file 106(1). Alternatively, if the user selects the cancel option 304, the application 104(1) may not be installed on the user device 102 and consequently may not have access to any of the functionalities and/or data corresponding to the permissions requested.

In at least one embodiment shown in FIG. 3C, a user may customize a permissions profile via user input into user interface 306. The user may choose to "allow" 308 particular permissions (e.g., permissions 1, 3, and 5), "deny" 310 particular permissions (e.g., permissions 2 and 6), and request a "prompt" 312 before an application, such as application 104(1), attempts to access functionalities and/or data protected by particular permissions (e.g., permission 5). In such a scenario, when the user selects the install option 304, the package manager module 218 may modify an original permissions manifest file, such as original permissions manifest file 106(1), and/or create a new permissions manifest file, such as customized permissions manifest file 108(1). The customized permissions manifest file 108(1) may be stored in the computer-readable media 208 of the user device 102. The customized permissions manifest file 108(1) may store the state of each permission as defined by the user input. Upon receiving input to execute an application, such as application 104(1), a runtime environment provided by the runtime 224 may access the customized permissions manifest file 108(1) instead of the original permissions manifest file 106(1) associated with the application 104(1). Accordingly, when the application 104(1) subsequently executes, the application 104(1) may operate using the customized permissions profile indicated in the customized permissions manifest file 108(1), instead of the permissions profile associated with the original permissions manifest file 106(1).

For example, in the embodiment shown in FIG. 3C, when the user device 102 receives user input to launch application 104(1), application 104(1) may execute with permissions 1, 3, and 5. However, application 104 may execute without permissions 2 and 6. Additionally, each time application 104(1) is executed, the package manager module 218 may prompt the user with a user interface requesting the user to grant or deny permission 4.

During installation of the application 104(1), a user may alternatively select cancel option 304 and cancel the installation, denying all permissions for the application 104(1). However, in such an embodiment, the user may not have access to the application 104(1) or its associated functionality or data.

In at least one embodiment, a user may use an application permission control option to customize permissions after installation of an application, such as application 104(1). In such embodiments, the package manager module 218 may present to a user an interface similar to user interface 306 and the user my provide input to customize permissions for the application 104(1) by indicating whether to "allow" 308 permissions, "deny" 310 permissions, or receive a "prompt" 312 prior to accessing a functionality or data affected by a permission. As discussed above, the package manager module 218 may create a customized permissions manifest file, such as customized permissions manifest file 108(1), that may be associated with the application 104(1). Upon receiving input to execute the application 104(1), the a runtime environment provided by the runtime 224 may access the customized permissions manifest file 108(1) instead of a corresponding original permissions manifest file, such as original permissions manifest file 106(1). Accordingly, the application 104(1) may execute pursuant to the customized permissions profile of the customized permissions manifest file 108(1) instead of the permissions profile of the original permissions manifest file 106(1).

FIG. 4 illustrates a prompt on a user interface 400 for customizing a permission for an application, such as application 104(1), before an application 104(1) attempts to access a functionality or data affected by the permission. As described above, a user may select "prompt" 312, indicating that the user would like to receive a prompt prior to an application 104(1) accessing a functionality or data affected by the permission. As illustrated in FIG. 4, the package manager module 218 may present user interface 400 for receiving user input regarding a particular permission (e.g., permission 4, in response to user selection of "prompt" for permission 4 in FIG. 3C) as requested by application 104(1). The user may input custom permissions options for particular applications, such as applications 104(1)-104(N). In at least one embodiment, a user may select "allow always" 402, "allow once" 404, "deny once" 406, or "deny always" 408.

In at least one embodiment, when a user selects "allow always" 402, the user may be indicating that every time the application 104(1) requests access to a functionality or data affected by a particular permission, that the package manager module 218 allows the application 104(1) access to the functionality or data affected by the particular permission unless and until directed otherwise. In at least one embodiment, when a user selects "allow once" 404, the user may be indicating that the application 104(1) may access a functionality or data affected by the particular permission immediately following the selection of "allow once" 404. However, when an application 104(1) subsequently requests access to a functionality or data affected by the particular permission, the package manager module 218 may again prompt the user for permissions instruction. In at least one embodiment, when a user selects "deny once" 406, the user may be indicating that the application 104(1) may not access a functionality or data affected by a particular permission during an immediately subsequent execution of the application 104(1). Similar to the "allow once" 404 option, when an application 104(1) subsequently requests access to a functionality or data affected by the particular permission, the package manager module 218 may again prompt the user for permissions instruction. In at least one embodiment, when a user selects "deny always" 408, the user may be indicating that the application 104(1) may not access a functionally or data affected by the particular permission unless or until directed otherwise. A user may have an option to select a button 410 (e.g., "ok," etc.) on the user interface 400 to indicate he or she has defined how the application 104(1) may proceed.

There is no long term impact on the original permissions manifest files 106(1)-106(N) in embodiments where the user selects "allow once" 404 or "deny once" 406. However, in embodiments where the user selects "allow always" 402 or "deny always" 408 options, the package manager module 218 may be directed to modify an original permissions manifest file, such as original permissions manifest file 106(1) with respect to the permission specified (e.g., enable or disable). In other embodiments where the user selects "allow always" 402 or "deny always" 408 options, the package manager module 218 may be directed to modify or create a new permissions manifest file, such as customized permissions manifest file 108(1) or global permissions manifest file 110 with respect to the permission specified (e.g., enable or disable). As a result, the application 104(1) may execute based on the user input provided via a prompt as illustrated by user interface 400.

Global Permissions

Figure 5:
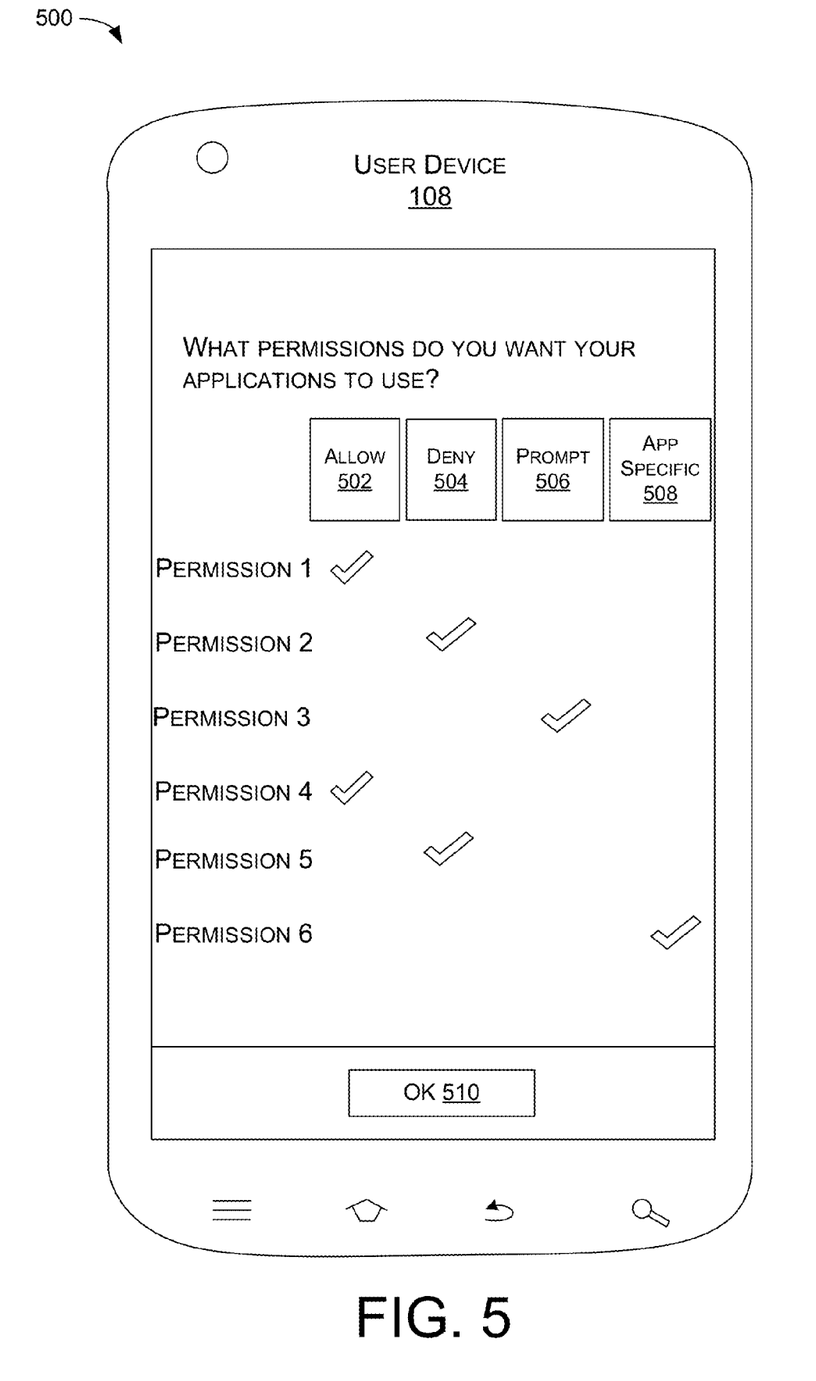
FIG. 5 illustrates an embodiment of a user interface for customizing a global permissions profile for applications.

FIG. 5 is a block diagram that illustrates an additional embodiment of a user interface 500 for customizing a global permissions profile for applications executed by a user device 102. In at least one embodiment, the package manager module 218 may provide a global permissions control option via a settings menu on the user device 102. The global permissions control option may permit users to customize a comprehensive list of permissions associated with the plurality of applications 104(1)-104(N). In some embodiments, permissions may be grouped into permission groups (e.g., "Services that cost you money," etc.).

As shown in FIG. 5, a user may choose an option to "allow" 502, "deny" 504, "prompt" 506, or request "app specific" 508 permissions for each permission (e.g., permissions 1-6) from user interface 500. In at least one embodiment, when a user indicates he or she would like to "allow" 502 a permission, he or she may be indicating that he or she wishes to always grant the permission, or permit access to the functionality and/or data affected by the permission, regardless of the application (e.g., any application of applications 104(1)-104(N)) that may be requesting the permission. In at least one embodiment, when a user indicates he or she would like to "deny" 504 a permission, he or she may be indicating that he or she would like to disable the permission, or withhold access to the functionality and/or data affected by the permission, regardless of the application (e.g., any application of applications 104(1)-104(N)) that may be requesting the permission. In at least one embodiment, when a user selects "prompt" 506, the user may be indicating that he or she would like to receive a prompt prior to any application (e.g., any application of applications 104(1)-104(N)) attempting to access the functionality and/or data protected by a permission. In such circumstances, the package manager module 218 may present a user with a prompt as shown and discussed in FIG. 4, whenever an application, such as application 104(1), requests access to the identified permission. When a user selects "application specific" 508, the user may be indicating that the customized permissions as indicated at the time of installation for each of the applications 104(1)-104(N) stored on the user device 102 should control the permissions profile for a particular permission. In such circumstances, a customized permissions manifest file, such as customized permissions manifest file 108(1), which corresponds to a particular application, such as application 104(1), may control access to functionality and/or data protected by the particular permission when the application 104(1) executes, instead of a corresponding original permissions manifest file, such as original permissions manifest file 106(1). A user may select a button 510 (e.g., "ok," etc.) to indicate he or she has provided input to define the global permissions profile via user interface 500.

In the at least one embodiment as shown in FIG. 5, a user has checked "allow" 502 for permissions 1 and 4. Accordingly, the user has indicated that he or she would like to always grant permissions 1 and 4, regardless of the application (e.g., any application of applications 104(1)-104(N)) that may be requesting permissions 1 or 4. Additionally, in the at least one embodiment, the user has checked "deny" 504 for permissions 2 and 5. Accordingly, the user has indicated that he or she would like to always deny or disable permissions 2 and 5, regardless of the application (e.g., any application of applications 104(1)-104(N)) that may be requesting permissions 2 or 5. The user also checked "prompt" 506 for permission 3 and "app specific" 508 for permission 6. Accordingly, the user has indicated that he or she would like to receive a prompt, as described in FIG. 4, prior to any of the applications 104(1)-104(N) attempting to access the functionality and/or data protected by permission 3. Additionally, the user has indicated that he or she would like to defer to a customized permissions manifest file, such as customized permissions manifest file 108(1) corresponding to an application, such as application 104(1), any time the application 104(1) requests access to the functionality and/or data protected by permission 6.

Based on user input defining the global permissions profile, the package manager module 218 may create a global permissions manifest file 110. The global permissions manifest file 110 may be stored in the computer-readable media 208. When the user device 102 receives input to execute an application, such as application 104(1), the runtime environment provided by the runtime 224 may access the global permissions manifest file 110 instead of the original permissions manifest file, such as original permissions manifest file 106(1) that is associated with the application 104(1). When the application 104(1) executes, the application 104(1) may operate using the permissions granted in the global permissions manifest file 110 instead of the corresponding original permissions manifest file 106(1).

Illustrative Embodiments

Figure 6:
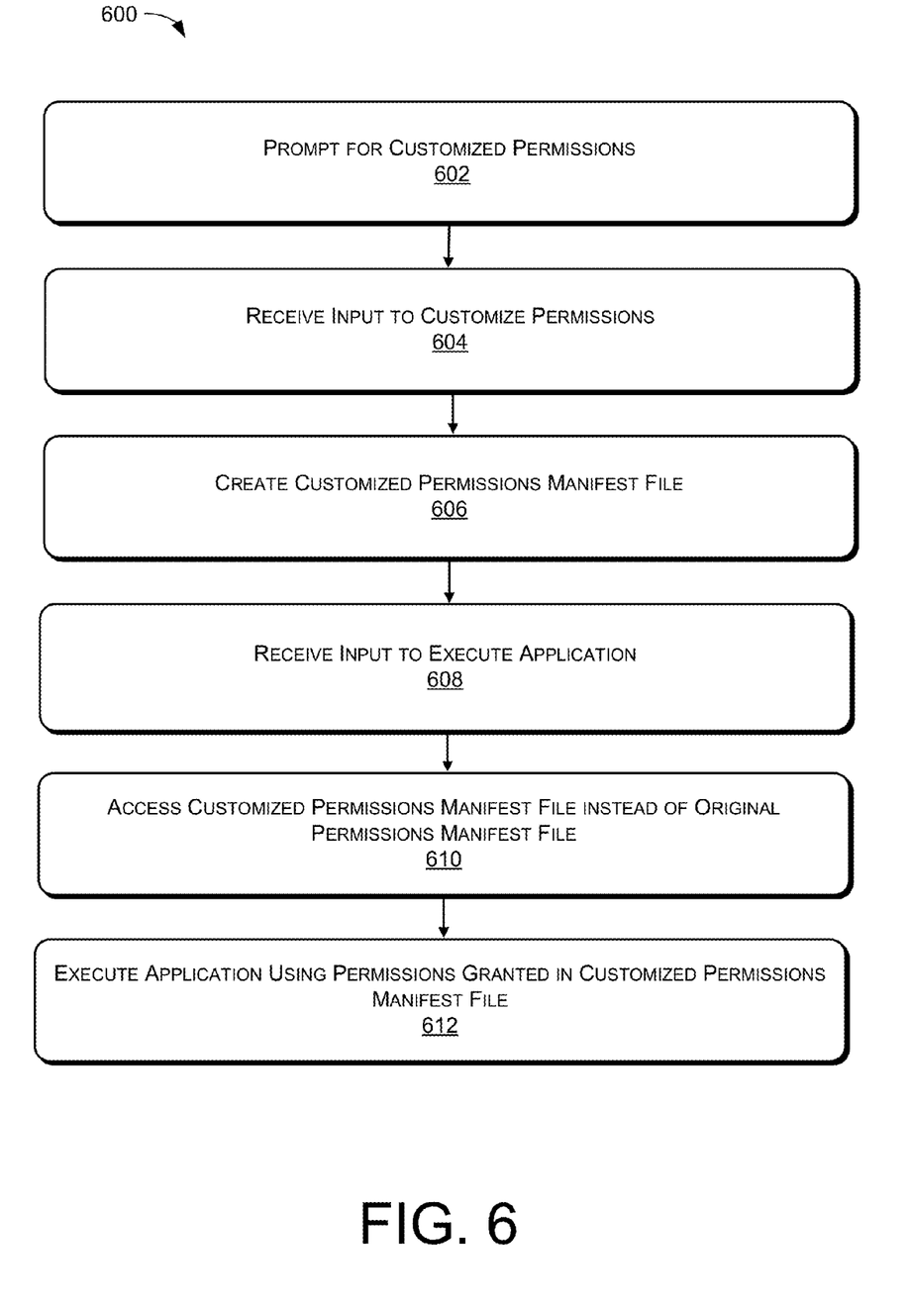
FIG. 6 is a flow diagram that shows procedures for customizing a permissions profile and executing an application using permissions granted in a customized permissions manifest file.

FIG. 6 is a flow diagram that shows procedures 600 for customizing a permissions profile and running an application, such as application 104(1), using permissions granted in a new permissions manifest file.

At block 602, the package manager module 218 prompts a user for customized permissions. As illustrated in FIGS. 3B and 3C and as described above, the package manager module 218 may prompt a user to provide input for customizing a permissions profile associated with at least one application, such as application 104(1). In at least one embodiment, the package manager module 218 prompts the user during installation of the application 104(1). In an alternative embodiment, the package manager module 218 prompts the user at some time after installation of the application 104(1).

At block 604, the package manager module 218 receives input to customize permissions. As described above, a user may provide input to customize a permissions profile. For example, the user may indicate that he or she would like to allow (e.g., 308) an application 104(1) to access functionality and/or data protected by individual permissions of a list of permissions. Alternatively, the user may indicate that he or she would like to deny (e.g., 310) the application 104(1) access to the functionality and/or data protected by individual permissions of a list of permissions. The user may also indicate that he or she would like to receive a prompt (e.g. 312) before the application 104(1) attempts to access the functionality and/or data protected by individual permissions for the application 104(1).

At block 606, the package manager module 218 creates a customized permissions manifest file, such as customized permissions manifest file 108(1), that is associated with the application 104(1). Upon receiving user input, the package manager module 218 may create a customized permissions manifest file 108(1), as described above. The customized permissions manifest file 108(1) may include the customized permissions profile and may be stored in the computer-readable media 208.

At block 608, the kernel 226 receives input to execute the application 104(1). In turn, the kernel 226 may start a process in which a runtime environment may be created for executing the application 104(1). In at least one embodiment, the runtime environment may be created by the runtime 224.

At block 610, the runtime environment accesses the customized permissions manifest file 108(1) instead of the corresponding original permissions manifest file 106(1).

At block 612, the runtime environment executes the application 104(1) using the customized permissions profile in the corresponding customized permissions manifest file 108(1). In at least one embodiment as described above, the customized permissions manifest file 108(1) may reduce the number of permissions an application 104(1) may be granted as compared to the original permissions manifest file 106(1).

Figure 7:
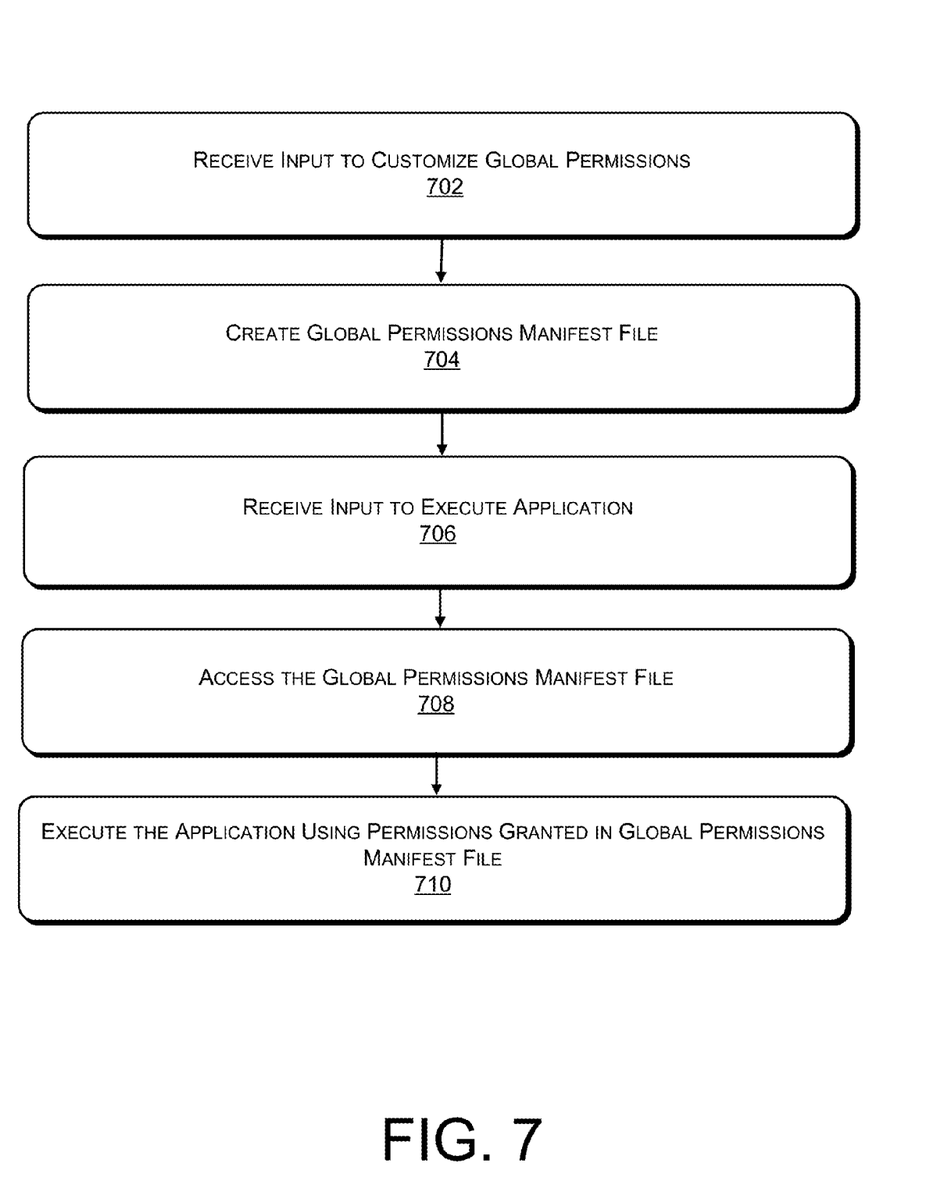
FIG. 7 is a flow diagram that shows procedures for customizing permissions profiles and executing an application using permissions granted in a global permissions manifest file.

FIG. 7 is a flow diagram that shows procedures 700 for customizing permissions profiles and executing applications 104(1)-104(N) using permissions granted in a global permissions manifest file 110.

At block 702, the packager manager module 218 receives input for customizing a global permissions profile. As described above, a user may access the global permissions manifest file 110 via a settings menu associated with the user device 102. In some embodiments, the user may indicate that he or she would like to allow (e.g., 502) all applications 104(1)-104(N) to access functionality and/or data protected by individual permissions of a list of permissions. Alternatively, the user may indicate that he or she would like to deny (e.g., 504) all applications 104(1)-104(N) access to functionality and/or data protected by individual permissions of a list of permissions. In some embodiments, the user may indicate that he or she would like to receive a prompt 506 before any application (e.g., any application of applications 104(1)-104(N)) attempts to access functionality and/or data protected by a particular permission. In other embodiments, a user may indicate that he or she would like the package manager module 218 to defer to a corresponding application specific permissions manifest file (e.g., a customized permissions manifest file, such as customized permissions manifest file 108(1)) for permissions specific to an application 104(1).

At block 704, the package manager module 218 creates a global permissions manifest file 110. As described above, upon receiving user input for customizing a global permissions profile, the package manager module 218 creates a global permissions manifest file 110. The global permissions manifest file 110 may be stored in the computer-readable media 220.

At block 706, the kernel 226 receives input to execute an application, such as application 104(1). In turn, the kernel 226 may start a process in which a runtime environment may be created for executing the application 104(1). In at least one embodiment, the runtime environment may be created by the runtime 224.

At block 708, the runtime environment accesses the global permissions manifest file 110 instead of an original permissions manifest file, such as original permissions manifest file 106(1), or a customized permissions manifest file, such as customized permissions manifest file 108(1). As described above, the runtime environment may access the global permissions manifest file 110 instead of the original permissions manifest file 106(1) associated with the application 104(1). In an embodiment where there is a customized permissions manifest file, such as customized permissions manifest file 108(1), in addition to the global permissions manifest file 110, the runtime environment may access the global permissions manifest file 110 instead of the customized permissions manifest file 108(1). In at least one embodiment, when a user defers to an application specific permissions manifest file in the global permissions manifest file 110 with respect to a particular application 104(1), the runtime environment may access the applicable customized permissions manifest file 108(1), instead of the global permissions manifest file 110.

At block 710, the runtime environment executes the application 104(1) granting permissions defined in the global permissions manifest file 110 instead of the original permissions manifest file 106(1) and/or the customized permissions manifest file 108(1). In at least one embodiment as described above, the global permissions manifest file 110 may reduce the number of permissions that applications 104(1)-104(N) may be granted as compared to the corresponding original permissions manifest files 106(1)-106(N). In at least one embodiment, when a user defers to an application specific permissions manifest file in the global permissions manifest file 110 with respect to a particular application 104(1), application 104(1) may operate having access to the customized permissions profile as identified in the applicable customized permissions manifest file 108(1), instead of the global permissions manifest file 110.

Figure 8:
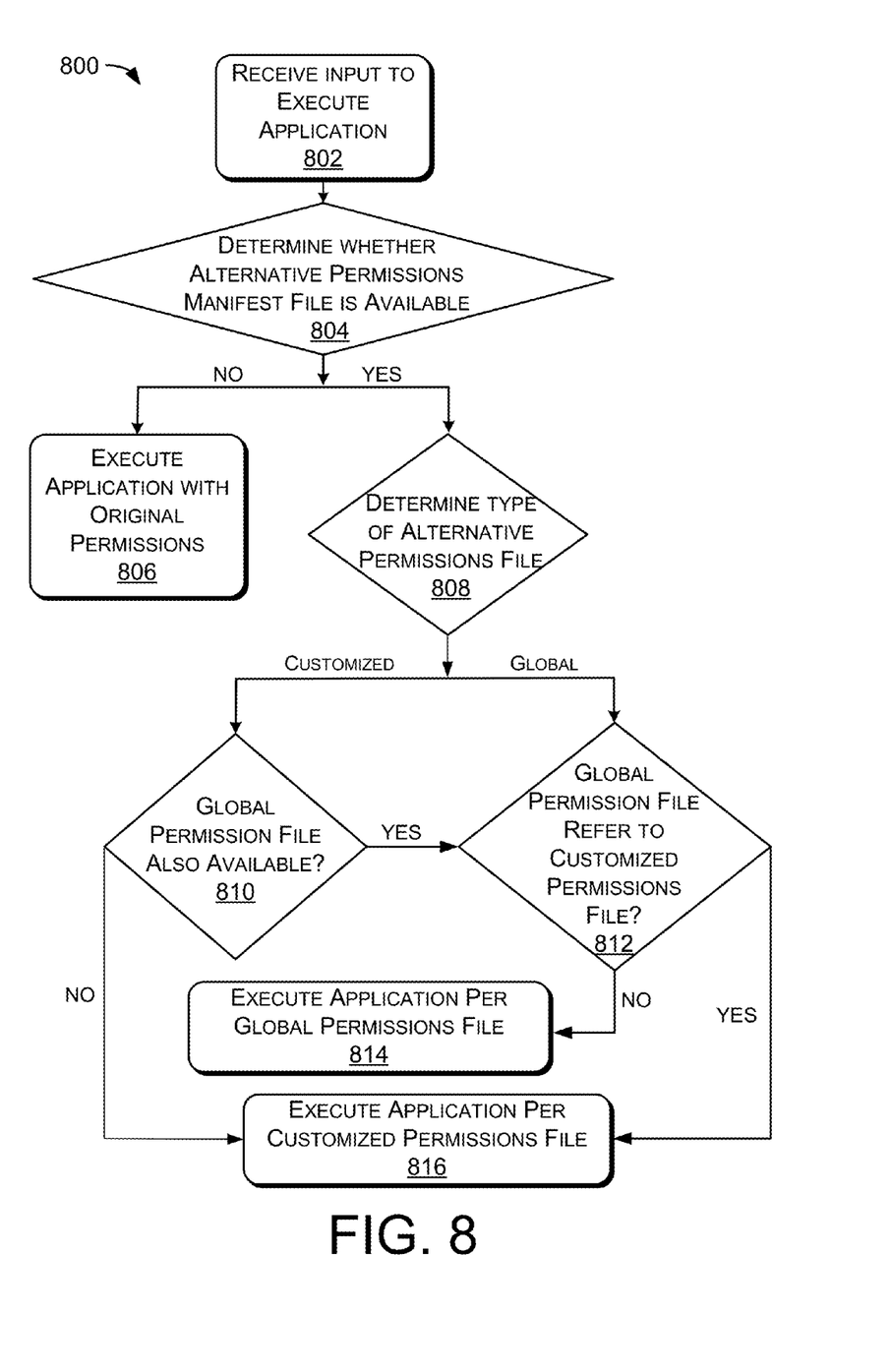
FIG. 8 is a flow diagram that shows procedures for customizing permissions profiles and executing applications using permissions granted in either a customized permissions manifest file or a global permissions manifest file.

FIG. 8 is a flow diagram that shows procedures 800 for customizing permissions profiles and executing an application, such as application 104(1), using permissions granted in either a customized permissions manifest file, such as customized permissions manifest file 108(1), or a global permissions manifest file 110.

At block 802, the kernel 226 receives input to execute an application 104(1). In turn, the kernel 226 may start a process in which a runtime environment may be created for executing the application 104(1). In at least one embodiment, the runtime environment may be created by the runtime 224.

At decision block 804, the runtime environment determines whether an alternative permissions manifest file is available in addition to the original permissions manifest file, such as original permissions manifest file 106(1). For example, the runtime environment determines whether a customized permissions manifest file 108(1) and/or a global permissions manifest file 110 is available.

At block 806, if no alternative permissions manifest file is available, the runtime environment executes the application 104(1) using the permissions granted in the original permissions manifest file 106(1). If neither a customized permissions manifest file 108(1) or a global permissions manifest file 110 is available, the runtime environment may operate application 104(1) using permissions granted in the original permissions manifest file 106(1).

At decision block 808, if an alternative permissions manifest file is available, the runtime environment determines a type of alternative permissions file available. For example, the runtime environment determines whether the alternative permissions manifest file is a customized permissions manifest file 108(1) or a global permissions manifest file 110, as described above.

If the alternative permissions manifest file is a customized permissions manifest file 108(1), at decision block 810, the runtime environment determines whether a global permissions manifest file 110 is also available. If a global permissions manifest file 110 is not available, the runtime environment executes the application 104(1) granting permissions specified in the customized permissions manifest file 108(1).

If a global permissions manifest file 110 is also available, the runtime environment determines whether the global permissions manifest file 110 refers to the customized permissions manifest file 108(1). If the global permissions manifest file 110 does not refer to a customized permissions manifest file 108(1), the runtime environment may execute the application 104(1) granting permissions specified in the global permissions manifest file 110, as shown in block 814. However, if a global permissions manifest file 110 refers to the customized permissions manifest file 108(1), application 104(1) may operate using the permissions granted in the customized permissions manifest file 108(1), as shown in block 816.

If a global permissions manifest file 110 is available, at decision block 812, the runtime environment determines whether the global permissions manifest file 110 refers to a customized permissions manifest file 108(1). If the global permissions manifest file 110 does not refer to the customized permissions manifest file 108(1), application 104(1) may operate using permissions granted in the global permissions manifest file 110, as shown in block 814. However, if the global permissions manifest file 110 refers to the customized permissions manifest file 108(1), application 104(1) may operate using permissions granted in the customized permissions manifest file 108(1), as shown in block 816.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   presenting, via a display of an electronic device, a user interface that displays a list of permissions associated with an original permissions manifest file associated with an application;
   receiving, based at least in part on an interaction with the user interface and at the electronic device, first input to customize the list of permissions;
   creating, based at least in part on the first input, a new permissions manifest file on the electronic device defining a permissions profile associated with at least the application, wherein the new permissions manifest file enables fewer individual permissions of the list of permissions than the original permissions manifest file;
   receiving second input to execute the application at the electronic device;
   accessing the new permissions manifest file instead of the original permissions manifest file stored on the electronic device; and
   executing the application, on the electronic device, using the permissions profile associated with at least the application as defined in the new permission manifest file instead of the original permissions manifest file.

2. The computer-implemented method of claim 1, wherein the user interface is presented for an installation of the application and includes a plurality of options for defining the permissions profile as a customized permissions profile for the application, the plurality of options for an individual permission of the list of permissions including:
   granting the individual permission;
   denying the individual permission; and
   requesting a prompt before the application attempts to access a functionality of the electronic device or data stored on the electronic device that is protected by the individual permission.

3. The computer-implemented method of claim 2, further comprising presenting the prompt at a time the application attempts to access a functionality of the electronic device or data stored on the electronic device that is protected by the individual permission, wherein the prompt includes a set of options, the set of options including:
   always granting the individual permission of the list of permissions;
   granting the individual permission of the list of permission for the time requested;
   always denying the individual permission of the list of permissions; and
   denying the individual permissions of the list of permissions for the time requested.

4. The computer-implemented method of claim 1, wherein the user interface is presented at a time subsequent to an installation of the application and includes a plurality of options for defining the permissions profile as a global permissions profile associated with at least the application and one or more additional applications, the options including:
   granting a particular permission of the list of permissions;
   denying the particular permission of the list of permissions;
   requesting a prompt before the application or the one or more additional applications attempt to access functionality or data protected by the particular permission of the list of permissions; and
   referring to a customized permissions manifest file before the application or the one or more additional applications attempt to access functionality or data protected by the particular permission.

5. The computer-implemented method of claim 4, wherein first permissions defined in the global permissions profile supersede second permissions defined in a customized permissions profile.

6. The computer-implemented method of claim 1, wherein the list of permissions comprises a same list of permissions identified in the original permissions manifest file.

7. A non-transitory computer storage media storing computer-executable instructions that, when executed, cause one or more processors to perform acts comprising:
presenting a user interface that displays a list of permissions associated with an original permissions manifest file associated with an application;
creating, based at least in part on an interaction with the user interface, an alternative permissions manifest file, the alternative permissions manifest file defining a permissions profile associated with at least the application that enables fewer individual permissions of the list of permissions than the original permissions manifest file;
receiving an input to execute the application;
determining that at least one alternative permissions manifest file is available; and
operating the application according to a permission defined in the at least one alternative permissions manifest file instead of the original permissions manifest file based at least in part on determining that the at least one alternative permissions manifest file is available.

8. The non-transitory computer storage media of claim 7, wherein the at least one alternative permissions manifest file includes at least one of a customized permissions manifest file that includes first permissions used by the application or a global permissions manifest file that includes second permissions jointly used by the application and one or more additional applications.

9. The non-transitory computer storage media of claim 8, the acts further comprising:
determining that the at least one alternative manifest file includes the customized permissions manifest file and excludes the global permissions manifest file; and
operating the application according to the first permissions.

10. The non-transitory computer storage media of claim 8, wherein the first permissions are defined at an installation of the application using options comprising:
granting a first set of permissions of a list of permissions requested by the application;
denying a second set of permissions of the list of permissions requested by the application; and
requesting a prompt before the application attempts to access functionality or data protected by a third set of permissions of the list of permissions requested by the application.

11. The non-transitory computer storage media of claim 8, the acts further comprising:
determining that the at least one alternative permissions manifest file includes the global permissions manifest file and the customized permissions manifest file; and
operating the application based at least in part on accessing the global permissions manifest file prior to accessing the customized permissions manifest file.

12. The non-transitory computer storage media of claim 11, the acts further comprising:
determining whether the global permissions manifest file refers to the customized permissions manifest file;
based at least in part on determining that the global permissions manifest file refers to the customized permissions manifest file, executing the application according to the first permissions; and
based at least in part on determining that the global permissions manifest file does not refer to the customized permissions manifest file, executing the application according to the second permissions.

13. The non-transitory computer storage media of claim 8, the acts further comprising:
determining that the at least one alternative permissions manifest file includes the global permissions manifest file and excludes the customized permissions manifest file; and
operating the application according to the second permissions.

14. The non-transitory computer storage media of claim 8, wherein the second permissions are defined following an installation of the application using options comprising:
granting a first set of permissions of a list of permissions;
denying a second set of permissions of the list of permissions;
requesting a prompt before the application or the one or more additional applications attempt to access functionality or data protected by a third set of permissions of the list of permissions; and
referring to the customized permissions manifest file before the application or the one or more additional applications attempt to access functionality or data protected by a fourth set of permissions of the list of permissions.

15. A device comprising:
one or more processors; and
a memory that includes a plurality of computer-executable components the plurality of computer-executable components comprising:
one or more applications;
an application framework for presenting a list of permissions associated with the one or more applications, wherein the application framework includes a package manager module for presenting the list of permissions via a user interface and receiving first input based on an interaction with the user interface, the first input enabling customization of the list of permissions by reducing a number of permissions granted by the list of permissions for the one or more applications; and
at least one permissions manifest file that applies one or more permissions of the list of permissions when executing the one or more applications.

16. The device of claim 15, wherein the at least one permissions manifest file comprises at least one of:
an original permissions manifest file defining a permissions profile for execution with a particular application of the one or more applications;
a customized permissions manifest file defining a customized permissions profile for execution with the particular application of the one or more applications, the customized permissions profile being customized based at least in part on the first input; or
a global permissions manifest file defining a global permissions profile associated with the one or more applications, the global permissions profile being customized based at least in part on the first input.

17. The device of claim 16, wherein the package manager module presents the user interface upon installation of the one or more applications for defining the customized permissions profile.

18. The device of claim 16, wherein the package manager module presents the user interface at a time after installation of the one or more applications for defining the global permissions.

19. The device of claim 16, wherein the application framework is further for:
- receiving second input to execute a particular application of the one or more applications; and
- applying at least one of the permissions profile, customized permissions profile, or global permissions profile based on the at least one permissions manifest file when executing the particular application.

20. The device of claim 19, wherein the applying the at least one of the permissions profile, customized permissions profile, or global permissions profile comprises:
- based at least in part on determining that the at least one permissions manifest file excludes the customized permissions manifest file and the global permissions manifest file, applying the permissions profile;
- based at least in part on determining that the at least one permissions manifest file includes the global permissions manifest file but excludes the customized permissions manifest file, applying the global permissions profile;
- based at least in part on determining that the at least one permissions manifest file includes the customized permissions manifest file but excludes the global permissions manifest file, applying the customized permissions profile; and
- based at least in part on determining that the at least one permissions manifest file includes the customized permissions manifest file and the global permissions manifest file, applying the global permissions profile, unless the global permissions manifest file refers to the customized permissions manifest file, then applying the customized permissions profile.

* * * * *